United States Patent
Van Oosterhout

(10) Patent No.: US 7,369,279 B2
(45) Date of Patent: May 6, 2008

(54) SYSTEM AND METHOD TO RESTRICT COPYING, SCANNING AND TRANSMITTAL OF DOCUMENTS OR PARTS OF DOCUMENTS

(75) Inventor: Jack T. Van Oosterhout, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 900 days.

(21) Appl. No.: 10/389,653

(22) Filed: Mar. 13, 2003

(65) Prior Publication Data

US 2004/0179220 A1   Sep. 16, 2004

(51) Int. Cl.
*H04N 1/44* (2006.01)
*G06F 21/22* (2006.01)
*G06F 21/24* (2006.01)

(52) U.S. Cl. .............. 358/3.28; 358/1.15; 358/1.14; 358/1.13; 358/442; 358/462; 358/2.1; 382/317; 382/306; 709/225; 726/2; 726/4; 726/21

(58) Field of Classification Search .............. 358/1.14, 358/1.13, 1.15, 442, 3.28, 462, 2.1; 340/5.86; 382/306, 317; 726/2, 4, 21
See application file for complete search history.

(56) References Cited

U.S. PATENT DOCUMENTS

| | | | |
|---|---|---|---|
| 4,486,090 A | | 12/1984 | Warhol |
| 4,603,970 A | | 8/1986 | Aota et al. |
| 4,908,873 A | * | 3/1990 | Philibert et al. ............ 382/100 |
| 5,018,767 A | * | 5/1991 | Wicker ........................ 283/67 |
| 5,440,409 A | | 8/1995 | Sugano et al. |
| 5,481,378 A | | 1/1996 | Sugano et al. |
| 5,604,596 A | * | 2/1997 | Ukai et al. ................... 358/296 |
| 5,644,408 A | * | 7/1997 | Li et al. ....................... 358/468 |
| 5,647,010 A | * | 7/1997 | Okubo et al. ............... 382/100 |
| 5,781,653 A | | 7/1998 | Okubo |
| 5,917,619 A | | 6/1999 | Yamagata et al. |
| 5,974,202 A | * | 10/1999 | Wang et al. ................ 382/306 |
| 5,982,956 A | * | 11/1999 | Lahmi ........................ 382/306 |
| 5,999,766 A | * | 12/1999 | Hisatomi et al. ............ 399/80 |
| 6,011,857 A | | 1/2000 | Sowell et al. |
| 6,103,353 A | * | 8/2000 | Gasper et al. ........... 428/195.1 |
| 6,202,066 B1 | * | 3/2001 | Barkley et al. ............... 707/9 |
| 6,202,092 B1 | * | 3/2001 | Takimoto ................... 709/225 |

(Continued)

FOREIGN PATENT DOCUMENTS

EP          766449 A2 *   4/1997

(Continued)

*Primary Examiner*—Aung S. Moe
*Assistant Examiner*—Chad Dickerson

(57) ABSTRACT

A document-security system, methodology, resulting secured documents, and related matters, regarding establishing flexible and versatile control over the acts of scanning, copying, faxing, e-mailing, or otherwise reproducing or converting into another data format, such as an electronic data-stream, and enabling the transmission of, printed-document information-content. The invention, in a manner of speaking, rests, at least in part, upon the concept of "regional" and "manner-specific" marking of print media, in generally a technically easy and conventional implementation fashion, employing standardly available office business supplies and equipment. The proposed document marking is readable by appropriately "trained" machines, such as a scanner, and permission control, as contemplated by practice of the invention, allows and confirms to differently authorized/authenticate persons the ability to "execute" the mentioned kinds of data-conversion and transmission activities.

10 Claims, 3 Drawing Sheets

U.S. PATENT DOCUMENTS

| | | | |
|---|---|---|---|
| 6,647,126 B1 * | 11/2003 | Wen | 382/100 |
| 6,827,279 B2 * | 12/2004 | Teraura | 235/492 |
| 2001/0017708 A1 * | 8/2001 | Kobayashi et al. | 358/1.13 |
| 2001/0035972 A1 * | 11/2001 | Wurmfeld | 358/1.13 |
| 2002/0027673 A1 * | 3/2002 | Roosen et al. | 358/1.13 |
| 2002/0033965 A1 * | 3/2002 | Winter et al. | 358/1.15 |
| 2002/0080959 A1 * | 6/2002 | Weller | 380/55 |
| 2003/0007178 A1 * | 1/2003 | Jeyachandran et al. | 358/1.15 |
| 2003/0025951 A1 * | 2/2003 | Pollard et al. | 358/505 |
| 2003/0142359 A1 * | 7/2003 | Bean et al. | 358/3.28 |

FOREIGN PATENT DOCUMENTS

| | | | |
|---|---|---|---|
| EP | 0789480 | A2 | 8/1997 |
| EP | 0789480 | A3 | 10/1997 |
| JP | 07087309 | | 3/1995 |
| JP | 07154591 | | 6/1995 |
| JP | 07154592 | | 6/1995 |
| JP | 07154593 | | 6/1995 |
| JP | 08172529 | | 7/1996 |
| JP | 08230243 | A * | 9/1996 |
| JP | 10310306 | A * | 11/1998 |
| JP | 2001189855 | A | 7/2001 |

* cited by examiner

SYSTEM AND METHOD TO RESTRICT COPYING, SCANNING AND TRANSMITTAL OF DOCUMENTS OR PARTS OF DOCUMENTS

INTRODUCTION

This invention pertains to the machine-readable marking of documents for the purpose of implementing permission (access) control relating to the reproduction or conversion of document data into another media format, such as into an electronic data-stream. In particular it relates (a) to a highly flexible and versatile system and method for effecting such marking, (b) to a resulting marked document (an authentication-access, restriction-controlled document), (c) to a system and method for reading marked documents and for training a machine to do such reading, and (d) to authenticating or authorizing selected people to be associated appropriately with different levels of permission control. For example, office supplies might include a selection of various, conventionally available pre-colored papers, and these might be chosen and employed in manners where their respective colors have been assigned to represent different selected restriction levels.

The systemic apparatus, the methodology, the resulting marked documents, and the kinds of personal authorizations that are embodied in the practice of the present invention feature wide variability and selectability in relation to document permission-control activities. According to the invention, permission-control restriction-marking can be implemented from a number of freely selectable possibilities. Structural and methodologic components by way of which choices are made available, variously referred to herein as collection structures, include (a) different categories and levels of restriction, (b) different styles and manners of placing markings on document contents, including whole-document (WD) marking, whole-page (WP) marking within a document, and partial-page (PP) marking within a document, (c) different specific styles (appearances) of marking, and (d) different levels of user authorizations/authentications that can be associated with different levels of restriction, thus to permit, freely and flexibly, differently authenticated users to gain data-stream conversion access (permission) to different levels of restricted material.

Fundamentally, the invention is concerned with the practice of affording flexible control over the manners in which data-conversion activities relating to document contents, including the activities of scanning, faxing, e-mailing, copying and others, can be associated with freely selectable portions of documents, and all in a manner which enables restriction-marking utilizing conventional and widely available office equipment, and further including relatively simple procedures for "training" reading machines to read and understand restriction-control in the forms implementable by the invention.

It is well known that, in many businesses, different categories of documents, which are intended to be accessible for various purposes in different ways to different people, are created, and an issue frequently arises about how best to implement ways of automatic control that can prevent unauthorized and non-properly authenticated persons from copying, scanning, faxing, e-mailing, etc., restricted documents, document pages, and/or page portions which are not intended for their access to do such things. Such copying, scanning, faxing and e-mailing events constitute acts that are referred to herein as acts of conversion from one data medium to another data medium.

In the past, restriction-marking approaches have been confined largely to the marking of whole documents, or to the marking of whole pages within a document, often employing marking techniques which must be implemented by equipment which is not considered widely available, standard office equipment. For example, where marking is based upon special papers that may have special surface qualities, reflection qualities, content qualities, etc., such materials do not usually make up a traditional component in office supplies, and thus to be used must be brought in as special inventory materials in a business. The use of specially marked or content-structured papers are generally relatively expensive, and thus are only useable at an added expense which many users would like very much to avoid.

Further, traditional restriction-marking approaches do not offer the possibility for targeted marking of small portions, for example, within a document, or within a single page in a document, which limitation minimizes control-marking flexibility.

The present invention proposes a document-marking environment and practice wherein widely available, conventional office supplies and equipment can be employed easily and extremely flexibly to mark against unauthorized activities such as those mentioned above, not only whole documents and partial documents (i.e., selected whole pages in documents), but also selected portions within a page in a multi-page document. To offer such an environment, the invention features structure and methodology, as well as resulting marked documents, that are based upon a large "palette" of selectablity that is presented to a user at the time that document-restriction marking is to take place. Included in the areas of selectability are: (a) a list of different levels of restriction with respect to which a user can designate document portions for different levels of conversion-permission control; (b) a list of plural selectable regions of a document for marking, including whole document marking, partial-document marking on a full-page-by-full-page basis, and partial-page marking of selected pages within a multi-page document; (c) a list from which different users who have been authenticated at different restriction levels can be associated with the different selectable levels of restriction just mentioned; and (d) a selection of styles of marking per se, which can include features such as page color, region color, page shade, region shade, page background pattern, region background pattern, font features, such as font style and color, and many others. Substantially all of these marking per se modalities are readily implemented within the usual traditional office environment utilizing readily available materials and office-conventional equipment.

All of the versatility, subtlety, and ready implementability of the present invention, its structure, its practice, and it resulting marked documents, and of its offered advantages, are fully disclosed below in detail in conjunction with the several, accompanying labeled drawing figures.

DETAILED DESCRIPTION OF THE INVENTION

Figure 3:
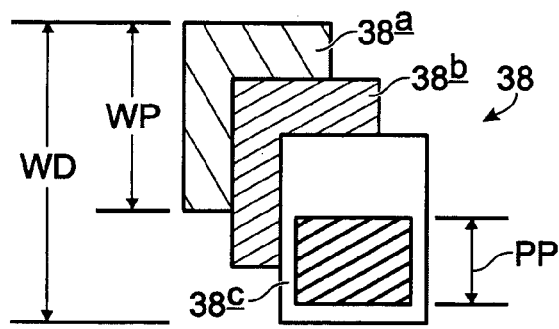
FIG. 3 is a related illustration highlighting how full-document (WD) marking, full single-page (WP) marking, and partial-page (PP) marking can be employed utilizing various marking styles.
Figure 4:
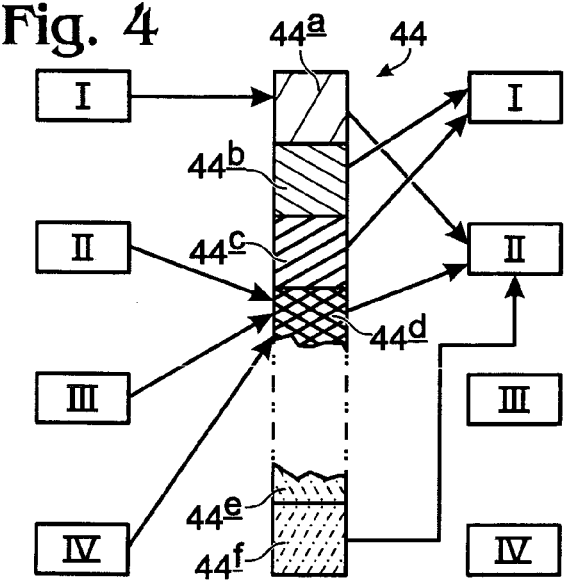
FIG. 4 is a schematic and story-telling diagram illustrating how different categories of persons may be associated both with different levels of authentication/authorization, and with different levels of marking restriction in accordance with practice of the invention.
Figure 5:
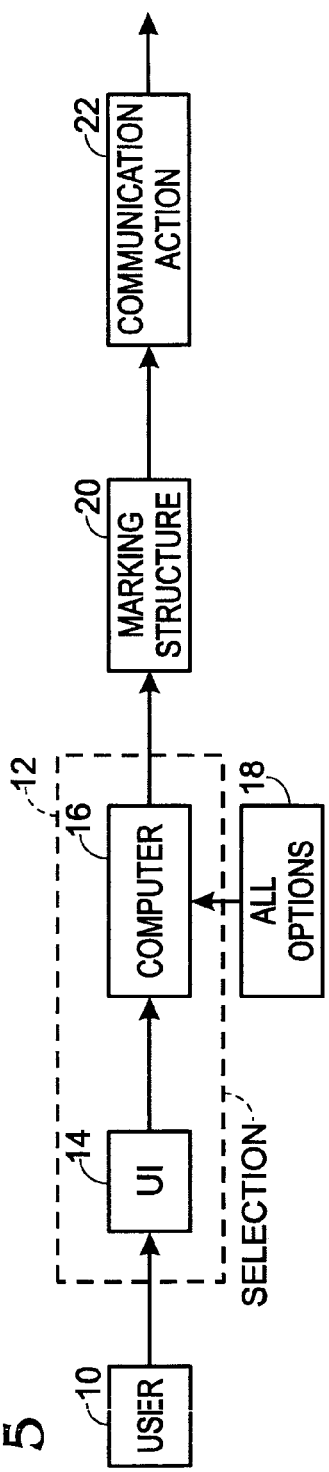
FIG. 5 is a block/schematic diagram of the overall structure of a system which implements practice of the present invention.

Turning now to the drawings, and referring first of all to FIGS. 1-5, inclusive, much of the overall capability of the present invention can first be described and understood with respect to what is shown in FIG. 5. Here, what is illustrated is a user 10 engaged in preparing (or creating) a document for restriction-permission control (also referred to as access control) in accordance with the invention. The user gains functional access to the workings of a selection structure 12 (also called herein an environment for selectability) through an appropriate user interface 14 which forms part of structure 12, and which is effectively coupled to data-processing, or computer-like, hardware 16 that affords user access to essentially all of the marking and control options 18 which are provided in accordance with the present invention for creating control-marked documents and portions of such documents. The mentioned user interface and the data-processing structure might, for example, typically take the form of that which a user gains access to in the employment of an office-conventional MFP device, a printer, and/or a facsimile machine, each of which devices includes various kinds of conventional user-interface structure that couples with internal processing, computer-like structures that are entirely capable of implementing certain steps involved in the practice of this invention. The content of block 18, which is marked "All Options" in FIG. 5, will be explained shortly.

Under the appropriate control of computer-like structure 16, instructions regarding options selected from block 18 are supplied to an appropriate marking structure, or marking environment, 20, which might typically take the form of a conventional printer marking engine, which prepares a restriction-marked document for feeding outwardly, so-to-speak, for subsequent communication action 22. Such communication action might typically include the previously referred-to activities of copying, scanning, faxing and e-mailing (or otherwise data-converting) a document's printed contents. Activities performed within block 22 in FIG. 5 can be thought of as taking the form of the conversion of printed document data into another surrogate data form, or data-stream, such as an electronic data-stream, that can be employed for transmission over a network, such as the Internet, for later review and processing, such as for implementing a re-printing, or further transmission of, the associated document information.

What is important in the practice of the present invention, in the setting of the systemic structural organization pictured in FIG. 5, is that documents prepared in accordance with the invention, and/or portions of these documents, in terms of how they can be dealt with by users possessing different authorization or authentication levels, will only be "processable" (i.e., scannable, copyable, faxable, e-mailable or otherwise convertible, transmittable, etc.) where a user's authentication level is appropriate to a particular restriction-marking level. And so, for example, if there is a section of a marked document which might include portions which a user of a certain authentication level is not permitted to copy, scan, fax or e-mail, etc., when that user attempts to perform one of these unauthorized actions, the appropriate marking scheme which is intended to accomplish this restriction, and which has been implemented by the present invention, is appropriately read by the device which that user attempts to use to perform one of these acts. When that "reading" takes place, the restriction effectively is applied, whereby unauthorized activity which the user calls for will not take place. It will be understood, accordingly, that the restriction-marking which is performed by practice of this invention is marking which can easily be read by an appropriately "trained" reading machine (such as a software-controlled, otherwise conventional scanner), trained in accordance with practice of the invention. Reading of such marking information will effectively cause communication and data-conversion action to be appropriately blocked. It should further be pointed out that conversion-restriction could be invoked, if desired, for selected ones only of the above-mentioned activities. For example, only e-mailing could be treated as a particular conversion-restricted activity.

Also noteworthy is that the system and method of this invention might utilize a marking and control strategy which might allow certain users to perform some, but not all possible, conversion functions. For example, a particular person might be "allowed", in accordance with practice of the invention, to copy, but not to fax or to e-mail, a document, or a part of a document.

Figure 1:
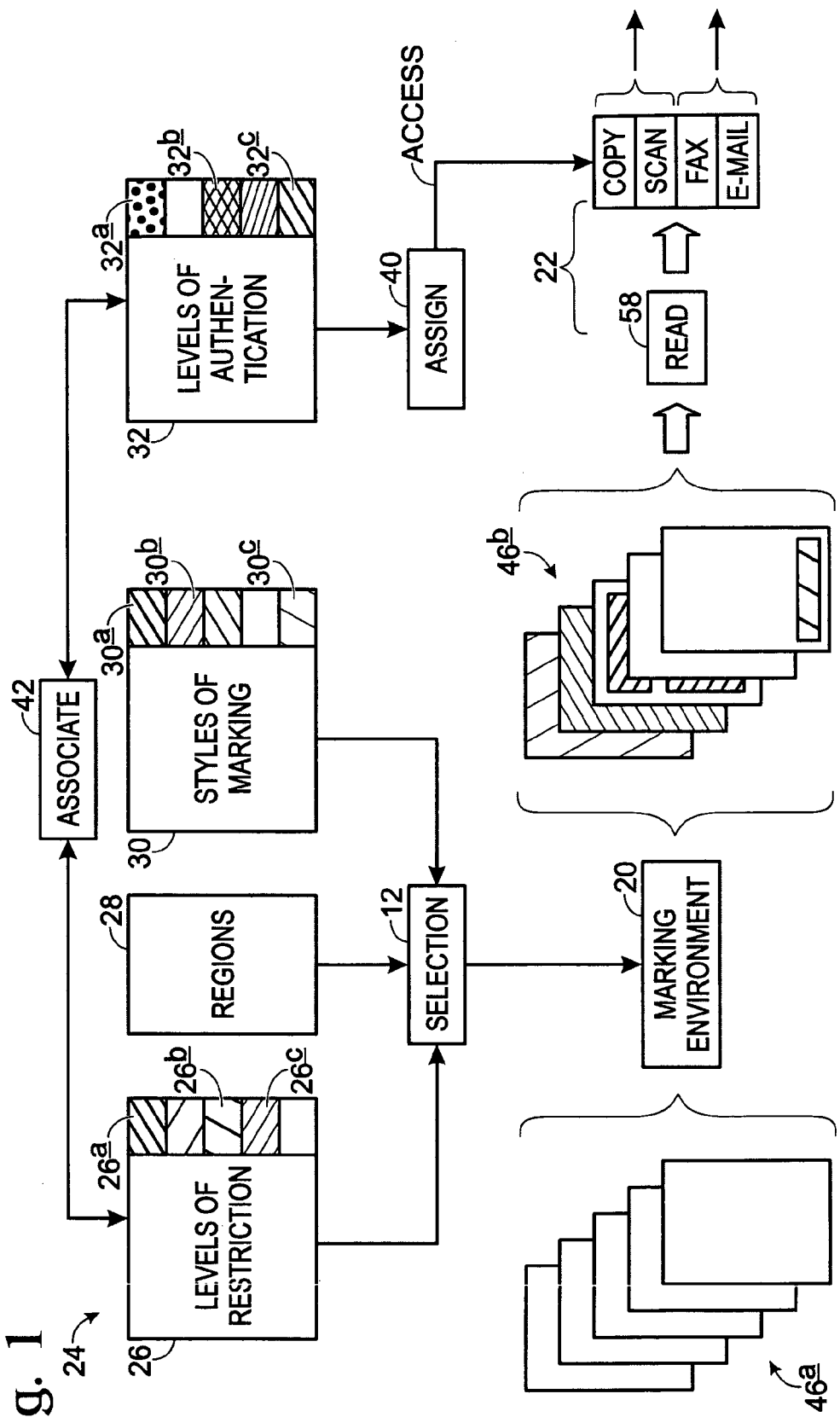
FIG. 1 is an overall block/schematic diagram illustrating the methodological and structural features of the present invention.

Turning attention now more specifically to FIG. 1 in the drawings, the overall operational arrangement implemented by the invention is indicated generally at 24 in this figure. Included within this arrangement, in addition to previously mentioned systemic components 12, 20, 22, are four blocks referred to herein as being collection structures of selectable parameters employed in the practice of the invention. These four blocks are shown at 26, 28, 30, 32. These four blocks make up previously mentioned "All Options" block 18 in FIG. 5.

Block 26 makes available to a user, for marking purposes in accordance with the invention, an appropriate collection of restriction levels, such as those represented individually by differently shaded regions 26a, 26b and 26c in block 26. These levels effectively define what might be thought of as different security levels of access-permission which can be selected in selection block 12 for use by a user.

Block 28 represents another selection collection structure, in this case offering a user an opportunity to select specific regions within a document, such as within a multi-page document, for marking. Such regions might include the whole document(WD), i.e., all pages in a document, a portion only of the document in the form of selected full pages (WP) within the document, and additionally, specifically selected regions within selected pages within a document (PP). Utilizing selection block 12, a user selects from block 28 just where in a particular document to implement marking-restriction control.

Figure 2:
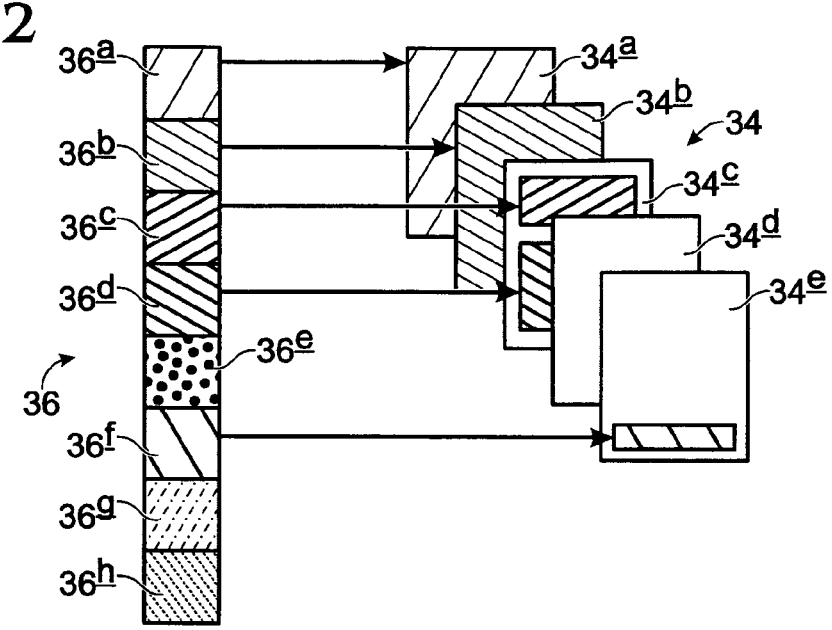
FIG. 2 is a schematic and story-telling diagram illustrating practices performed in accordance with the invention for marking, selectively, whole documents, whole single pages in documents, and partial pages in documents, utilizing different marking schemes which relate to different levels of selected permission-control restriction.

Looking for a moment at FIGS. 2 and 3, the operations of blocks 26 and 28 are further illustrated. Here there is shown in FIG. 2, generally at 34, a five-page document including pages 34a, 34b, 34c, 34d and 34e. At the left side of FIG. 2 there is illustrated a stack 36 including eight differently surface-marked squares 36a, 36b, 36c, 36d, 36e, 36f, 36g and 36h. The marked squares in this stack of squares represent different levels of restriction that are selectable from block 26.

As can be seen in FIG. 2, page 34a has been marked as a whole page with a restriction level 36a. Page 34b has been marked as a whole page, with restriction level 36b. Page 34c has been marked in two, partial-page, selected regions, with an upper region marked with restriction level 36c and a lower region marked with restriction level 36d. Page 34d is an unmarked and unrestricted page. Page 34e is shown with a small restricted marked area near the bottom of the page, marked with restriction level 36f.

FIG. 3 aids here in further understanding the choosability of different document regions for marking. Accordingly, with attention addressed to FIG. 3, the operation of block 28 in FIG. 1 is more fully illustrated. FIG. 3 shows a three-page document 38, including pages 38a, 38b and 38c. In this figure, the designator WD is used to represent full-page, whole-document marking. Marking styles appropriate for WD marking include, for example, paper color, paper brightness, paper grayscale shade, overall underlying visual pattern, all-over font characteristics, and others.

The designation WIP is used in FIG. 3 to represent whole-page, but not necessarily whole-document, marking. Marking styles appropriate for this kind of marking include all of the above, plus additional styles, such as specialized marks, bar codes, and machine intelligible text, among others.

The designation PP in FIG. 3 represents partial-page marking, and here, appropriate marking styles include regional color, regional tint, regional grayscale shade, and regional font characteristics, among others.

It should thus be apparent that a user can select, for document marking, any appropriate blend of any one or more of the selections made available from blocks 26, 28, 30, for implementation in marking environment, or structure, 20.

Returning to FIG. 1, block 30 represents still another collection structure offering selectability in the styles of marking, which styles may include any one or more of the styles mentioned earlier herein, such as page color, page background pattern, front style, font color, etc. The availability of such a collection of marking styles, chooseable by a user, is reflected in differently shaded squares, such as squares 30a, 30b and 30c in block 30. From the offerings of block 30, a user makes a selection appropriately of one or more of the various available marking styles for use at various locations in a document.

It should thus be apparent that a user can select, for document marking, any appropriate blend of any one or more of the selections made available from blocks 26, 28, 30, for implementation in marking environment, or structure, 20.

From a systemic point of view regarding the present invention, blocks 26, 28, 30 collectively constitute structure for providing an environment which offers selectability about the way in which a document, or parts of a document, are restriction marked. Block 12 is referred to as "additional structure" which is associated with blocks 26, 28, 30, and which enables a user to implement a marking selection, or selections. Block 20 is referred to as "yet further structure" which is associated operatively with blocks 12, 26, 28 and 30 for creating a marked document in accordance with user selection involving blocks 12, 26, 28, 30.

Block 32 represents yet another selection collection structure, here relating to the selection of different levels of authorization or authentication which may be granted differently to different persons. Shaded squares 32a, 32b and 32c in block 32 signify several such different authentication levels.

These levels of authentication can be assigned selectively to appropriate users who might typically be given passwords that identify them as possessing respective levels of authorization. Such an assignment activity is represented by block 40 in FIG. 1. Additionally, a block 42, which appears at the top of FIG. 1, allows a user of the system and methodology of this invention to create an operative association between different levels of authentication selected from block 32 and different levels of restriction selected from block 26. This practice of association can be performed in a number of different ways which are well within the knowledge and skill of those generally skilled in the relevant art, and perhaps preferably through the operation of selection block 12.

FIG. 4, now read along with FIG. 1 in relation to block 32, helps to illustrate the use of different modalities of authorization levels, and the assignments of such levels differentially to different persons, in accordance with practice of the invention.

Appearing fragmentarily as a vertical strip in the center of FIG. 4 is a stack 44 of surface-marked squares 44a, 44b, 44c, 44d, 44e, 44f. These differently marked squares represent different selectable levels of authentication (such as previously mentioned representative levels 32a, 32b, 32c) selectable from block 32 in FIG. 1.

To the right and to the left of this stack of marked squares in FIG. 4 are rectangles marked with the Roman numerals I, II, III and IV. These rectangles represent individual persons, or groups, who have been selected for different kinds of associations with different levels of document-access authentication.

As can be seen in FIG. 4, arrows are shown extending from the left set of Roman-numeral-marked rectangles representing individuals in FIG. 4, toward the stack of squares representing levels of authentication. Another set of arrows is shown toward the right side of FIG. 4 extending from different ones of the squares representing levels of authentication to two different ones of the four people represented in the stack of Roman-numeraled blocks at the right side of FIG. 4. The left-hand collection of arrows represents an association possibility, in accordance with practice of this invention, wherein each category of authentication may be associated with one to many different persons, or groups. The right set of arrows in FIG. 4 represents an association possibility, permitted by practice of the present invention, wherein each authenticated individual may be associated with one to many categories of authentication.

Thus, going down the list of Roman-numeraled representative persons on the left side in FIG. 4, person I is associated with authentication level 44a, and persons II, II and IV are each associated with authentication level 44d. Thus, this is an illustration wherein authentication level 44a is associated with one person, whereas authentication level 44d is associated with three different (many) persons.

Looking at the arrow scheme presented on the right side in FIG. 4, person I is associated with two different levels of authentication, 44b and 44c. Person II is associated with three different levels of authentication 44a, 44d, and 44f. Persons III and IV are not associated with any of the categories of authentication pictured in FIG. 4. Likewise, authentication level 44e is not associated with any of the persons shown in FIG. 4.

With respect to how an authenticated person identifies such authentication, this can be handled in a variety of ways. Such a person might be given a password to "enter". Another approach might involve the use of an appropriate control card. Biometric scanning, or other such positive identification practice, could be employed. There are many other identification possibilities, of course.

Continuing, now with a description of this invention as such is further illustrated in FIG. 1, indicated generally at 46a in FIG. 1 is a multi-page, unmarked document, with five, representative whole pages shown. At 46b, those very same five pages are illustrated as they have been permission-control marked in accordance with selections performed from blocks 26, 28, 30, utilizing selection block 12 and marking environment 20.

Looking at the collection of five document pages shown at 46b as pages which have been "treated" by marking environment 20: the uppermost page is shown as being marked in full with one level of restriction; the next lower page is shown as being marked in full with another restriction level; the third page down is illustrated as having two regions which are marked with two different restriction levels that are different from those that were used in the first two mentioned pages; the fourth page down is an unmarked page; and the bottom page has a very small portion marked at the lower region of the page with yet another level of restriction. Each of these pages and marked regions within pages, in addition to having certain regional-occupancy qualities on the respective pages, may additionally employ one or several different ones of the styles of marking that are selectable from block 30.

Figure 6:
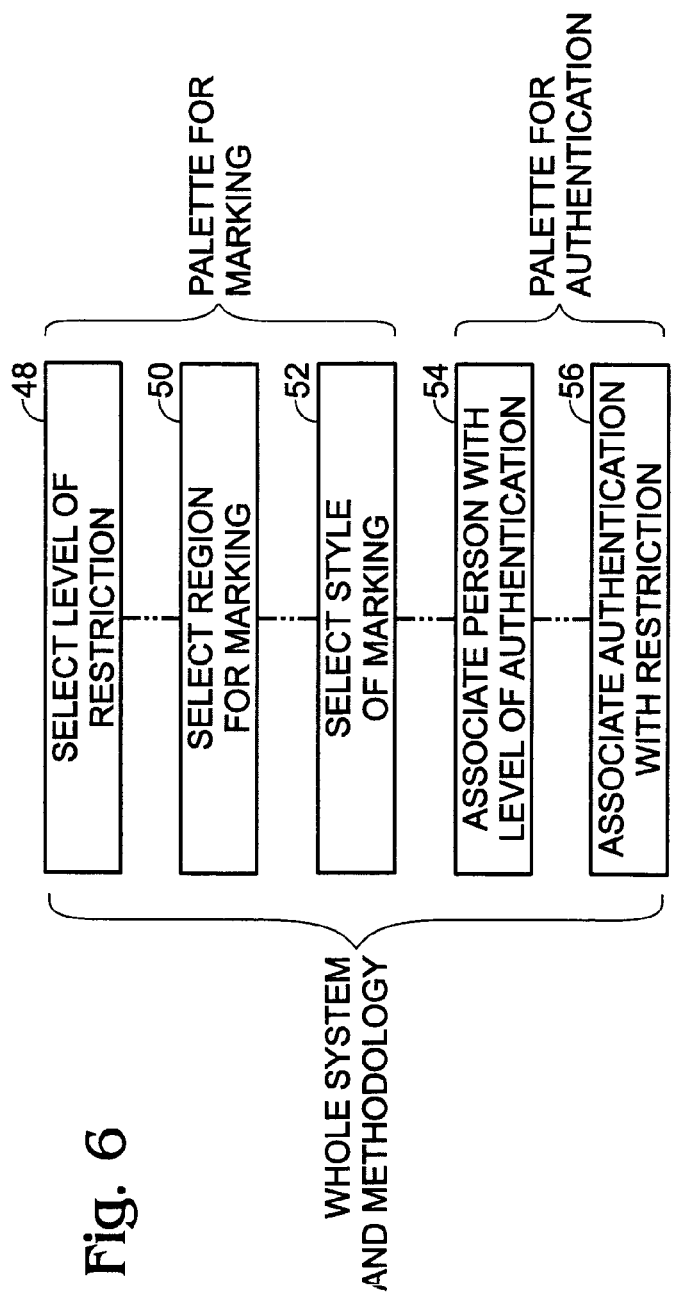
FIG. 6 is a block/schematic diagram illustrating, from another point of view, marking-control and association practices that may be implemented by and in the practice of the present invention.

Turning attention now to FIG. 6, this figure pictures the system and methodology of the present invention in five blocks 48, 50, 52, 54, 56. Given the description which has been presented above, the blocks pictured in this figure, and their working interrelationships, should be clearly evident.

In relation now to document permission-control with respect to a document which has been marked in accordance with the invention, when a user wishes to perform, in block 22, a communication action, also referred to herein as a conversion from print data to another data form, such as to a surrogate, electronic data-stream, a marked document in the possession of that user, such as the marked document pictured at 46b in FIG. 1, is appropriately fed into the machine or device (represented by block 22) which that user wishes to employ for such communication. In that machine, the document pages, on a page-by-page basis, are read by appropriate reading software which is represented by a block 58. In a manner of speaking, block 58 has been trained, in accordance with the invention, with respect to recognizing the security-marking styles, levels of authentication, etc., that have been selected. The user enters a password, or provides other evidence of authentication, which identifies that user, along with further identifying the one or several (if any) authorization level(s) that have(has) been assigned to that user. Block 58 correlates the user's assigned level of authentication with document security marking to determine whether or not the called for activity from block 22, with respect to different marked parts of such a document, will in fact be handled as requested by the user.

Machine "training", in relation to such reading-in of a marked document, can be performed in any one of a number software-related manners, whereby a block, such as block 58, will "learn" to recognize visually the restriction-level marking which has been applied to the subject document.

Where a user's entered password correlates with giving permission-access to a restriction-marked region in a document, the user-requested "communication" action will be enabled and performed. Wherever a non-correlation is detected, the related, restricted document region will not be communicated as called for by a user.

It will thus be seen that a wide flexibility, and great versatility, are offered according to the practice and the structure of the present invention for the marking and communication control of a whole document, of pages within documents, and of regions within pages in accordance with different restriction levels, different styles of marking, and different associations with levels of user authentication. All restriction marking is performed utilizing very conventional office supplies and equipment to offer a sophisticated and versatile technique for controlling data-conversion access to printed document material. It should be apparent that the numbers of levels of restriction, the designations of regions for marking, the styles of marking which can be employed, and the numbers and characters of levels of authentication that are permitted, are completely within the control of the user of this invention to fit that user's particular requirements and applications.

I claim:

1. A protection method relating to the creation of printed-document media involving, as a part of document creation, the implementing through marking of visually apparent machine-readable permission control regarding the post-created-document act of converting printed information contained in such a document into a surrogate data-stream of another one of plural, selectable media types, and wherein the mentioned permission control may be specific to a selected media type, or types, said method comprising providing an environment which offers to a user selectability, for marking such a document, of a printed-document visual component, including selectability of a marking-style characteristic for such a component, for association of that component with such permission control, where such offering enables user selection from within a free range of selections including, and under the selection control of style of marking, (a) all, or less than all, of the full pages in a document, and (b) the entirety, or less than the entirety, of a particular single such page in a document, enabling a user, via such a provided environment, to select at least one such visual printed-document component for controlled association with such permission control, and on the basis of such an enabled user selection, creating the desired document in a manner which embodies the user-selected, visual component-associated permission control, wherein the environment associates the selected style of marking with the selected permission control for the selected printed-document visual component.

2. The method of claim 1 which further includes, with respect to the utility of the provided selection environment, offering to a user the capability, within that environment, to associate different selected visual printed-document components with different selected categories of such permission control, which different categories may relate to differentiated permissions that are to be allowed for differently authenticated/authorized persons seeking to invoke an act of printed-information conversion to another media-type, surrogate, data stream.

3. The method of claim 2 which is established in a manner, in accordance with, and as a part of, the practice of the method, whereby a given category of permission is associable with at least two different persons each of whom is afforded an authenticated/authorization which differs from that which is afforded the other person.

4. The method of claim 2 which is established in a manner, in accordance with, and as a part of, the practice of the method, whereby a given person who is afforded a given level of authenticated/authorization may be related to at least two different categories of permission.

5. The method of claim 2 which further includes, with respect to the utility of the provided selection environment, offering to a user the capability within that environment to associate different selected, visual printed-document components with different selected categories of such permission control, which different categories may relate to differentiated permissions that are to be allowed for differently authenticated/authorized persons seeking to invoke an act of printed-information conversion to another media-type, surrogate, data stream, and which is established in a manner, in accordance with, and as a part of, the practice of the method, whereby a given category of permission is associable with at least two different persons, each of whom is afforded an authenticated/authorization which differs from that which is afforded the other person, and which is further established in a manner, in accordance with, and as a part of, the practice of the method, whereby a given person who is afforded a given level of authenticated/authorization may be related to at least two different categories of permission.

6. The method of claim 1 which is relevant to acts of conversion including at least one of the acts of (a) photocopying and (b) scanning.

7. The method of claim 1, wherein an act of conversion includes at least one of the acts of (a) photocopying, and (b) scanning, followed by at least one of the subsequent acts of (a) faxing, (b) e-mailing, and/or (c) otherwise electronically transmitting data derived from conversion.

8. The method of claim 1 which is relevant to at least one of the acts of (a) faxing and (b) e-mailing.

9. A system for implementing a protection method relating to the creation of printed-document media involving, as a part of document creation, the implementing through marking of visual, machine-readable permission control regarding the post-created-document act of converting printed information contained in such a document into a surrogate data-stream of another media type, comprising structure for providing an environment which offers to a user selectability, for such a document, of a visual, printed-document component for association with such permission control, where such offering enables user selection from within a free range of selections, and base, at least ion part, upon style of marking, including (a) all, or less than all, of the full pages in a document, and (b) the entirety, or less than the entirety, of a particular single such page in a document, additional structure, operatively associated with the first-above-mentioned structure enabling a user, via such a provided environment, to select at least one such visual, printed-document component for controlled association with such permission control, and yet further structure operatively associated with the first-mentioned and second-mentioned structures above, which yet further structure operates in a manner whereby, on the basis of such an enabled user selection, it creates the desired document in a manner which embodies the user-selected, component-associated permission control, wherein the system is adapted to associate the selected style of marking with the selected permission control for the selected printed-document visual component.

10. A selectively flexible document-marking method of controlling defined categories of access to printed document components which are to be read by a machine as a precursor to an event of conversion to a related data-stream comprising selecting a visual, printed document component for defined-category access control, with the selected visual component being drawn from a document characterization which includes at least one of (a) full page, and (b) partial page, and which is associated, respectively, with different styles of marking, and with respect to the selected visual document component, implementing access control in the printing of the visual component, which control can affect the behavior of machine reading of the visual component vis-a-vis machine conversion to a related data-stream, where the implemented access control is drawn from a selection of available access-control categories which includes, for at least one such category among the selection, a category that permits the designation of plural, differently authenticated/authorized persons including at least one person who is to be given conversion access, and at least one other person who is not to be given conversion access, wherein the implemented access control is determined based on the different styles of marking applied to the printed document.

\* \* \* \* \*